United States Patent

Shimizu

Patent Number: 5,673,262
Date of Patent: Sep. 30, 1997

[54] COMMUNICATION NETWORK COMPRISING TRANSIT SWITCHES WITHOUT ASYNCHRONOUS TRANSFER MODE SWITCHING CAPABILITY

[75] Inventor: Hiroshi Shimizu, Tokyo, Japan

[73] Assignee: NEC Corporation, Japan

[21] Appl. No.: 553,238

[22] Filed: Nov. 7, 1995

Related U.S. Application Data

[63] Continuation of Ser. No. 253,389, Jun. 3, 1994, abandoned.

[30] Foreign Application Priority Data

Jun. 3, 1993 [JP] Japan ................................. 5-133329

[51] Int. Cl.[6] ........................................................ H04L 12/56
[52] U.S. Cl. ........................... 370/395; 370/400; 370/905
[58] Field of Search ........................ 370/60, 60.1, 94.1, 370/94.2, 94.3, 58.2, 58.1, 110.1, 17, 13, 13.1, 84, 79, 235, 236, 354–356, 377, 384–389, 391–399, 400, 408, 409, 410, 537, 541, 542, 902, 905, 908, 916, 477; 340/825.03, 825.02

[56] References Cited

U.S. PATENT DOCUMENTS

| | | | |
|---|---|---|---|
| 5,189,673 | 2/1993 | Burton et al. | 370/110.1 |
| 5,289,460 | 2/1994 | Drake, Jr. et al. | 370/17 |
| 5,341,366 | 8/1994 | Soumiya et al. | 370/17 |
| 5,359,593 | 10/1994 | Derby et al. | 370/17 |
| 5,453,981 | 9/1995 | Katsube et al. | 370/60.1 |
| 5,517,497 | 5/1996 | Le Boudect et al. | 370/60.1 |

*Primary Examiner*—Dang Ton
*Attorney, Agent, or Firm*—Ostrolenk, Faber, Gerb & Soffen, LLP

[57] ABSTRACT

ATM network comprises an ATM cross connect network for connecting local switches to each other, and a signalling network including a plurality of transit switches each having a bandwidth management function to manage the bandwidth allocation of a prescribed link in the ATM cross connect network. By transmitting the control signal from an originating local switch to a destination through successive transit switches of the signalling network, a required bandwidth is allocated to a virtual channel of the ATM cross connect network. ATM cells are transmitted between the two local switches through the established virtual channel.

18 Claims, 7 Drawing Sheets

BANDWIDTH ALLOCATION SEQUENCE

DATA COMMUNICATION

COMMUNICATION NETWORK COMPRISING TRANSIT SWITCHES WITHOUT ASYNCHRONOUS TRANSFER MODE SWITCHING CAPABILITY

This is a continuation of application Ser. No. 08/253,389 filed on Jun. 3, 1994 now abandoned.

FIELD OF THE INVENTION

The present invention relates to a communication system comprising an ATM (Asynchronous Transfer Mode) cross connect network and a signaling network.

BACKGROUND OF THE INVENTION

For integrating multiple communication and multimedia communication, ATM communication technology in which a transfer unit is a fixed length cell is widely considered the most promising approach, and ATM system is received recognition as a suitable system for Broadband Integrated Services Digital Network (B-ISDN). However, since it costs too much for change of all the conventional cross connect systems and transit switches to ATM systems, it is to be desired to phase ATM realization while utilizing conventional systems.

In such transitional phase, the advantages of ATM communication system should not be damaged. For example, it is hardly to realize dynamic path control and management by only changing the cross connect system from existing Synchronous Transfer Mode (STM) to ATM, therefore the bandwidth of the transmission media cannot be utilized effectively. In this case, if one tries to realize the dynamic source management, then an ATM transit switch is necessary and it costs.

It is an object of the present invention to provide a communication system which can effectively utilize the transmission media in a cross connect network employing a transit switching system having no ATM switching function.

It is a further object of the present invention to provide a high efficient communication system which can reduce the scale and the number of functions of a transit switching system.

It is a still further object of the present invention to provide a communication system which can reduce the delay time of ATM cell transmission.

SUMMARY OF THE INVENTION

A communication network according to the present invention is comprised of an ATM cross connect network having a plurality of ATM multiplexers through which a local switch is connected to the other and a signalling network having local switches and transit switches through which a control signal is transmitted. Each transit switch has no ATM switching capability but a bandwidth management function of the ATM cross connect network.

The bandwidth management of the ATM cross connect network is carried out by the transit switches successively specified through the signalling network. First of all, a local switch transmits a control message comprising a channel specifying message and a bandwidth requesting message to the transit switch to which the local switch belongs. The channel specifying message is a message which specifies one of the virtual channels determined in advance in the ATM cross connect network depending on where the destination local switch is located. The requested bandwidth is allocated in the ATM cross connect network by the respective transit switches receiving the control message. After the virtual channel has been established between the two local switches through the ATM cross connect network, the originating local switch makes communication with the destination local switch through the established virtual channel.

DETAILED DESCRIPTION OF THE PREFERRED EMBODIMENTS

Figure 1:
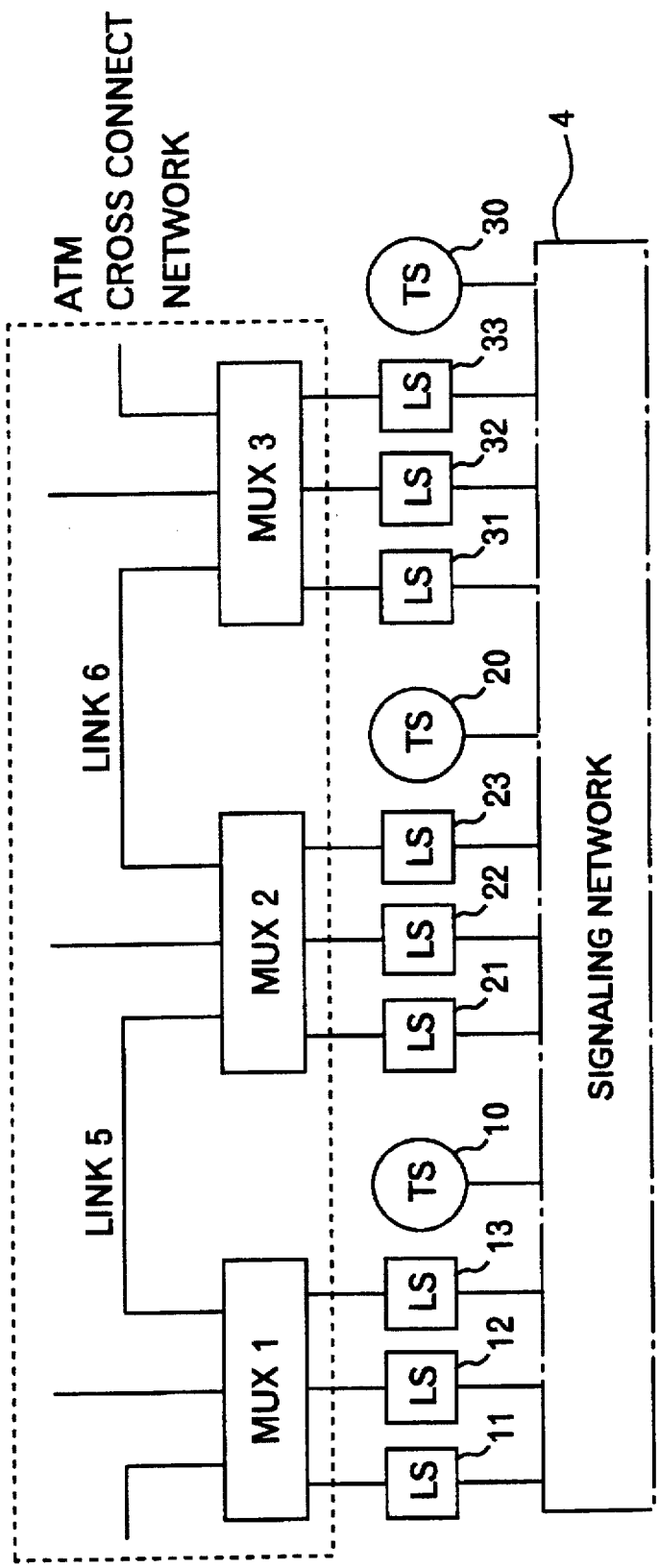
FIG. 1 is a schematic block diagram illustrating an ATM network system according to an embodiment of the present invention.

Referring to FIG. 1, the ATM cross connect network is comprised of a plurality of multiplexers indicated by MUX 1, MUX 2, MUX 3 and on. Local switches 11-13 are connected to each other through the multiplexer MUX 1, and in the same way, local switches 21-23 through the multiplexer MUX 2, and local switches 31-33 through multiplexer MUX 3. The multiplexer MUX 1 is connected to the multiplexer MUX 2 through a link 5, and the multiplexer MUX 2 is connected to the multiplexer MUX 3 through a link 6. Therefore, each local switch can make an ATM data communication to the other through predetermined multiplexers and links forming a specified virtual channel, as described later.

Figure 2:
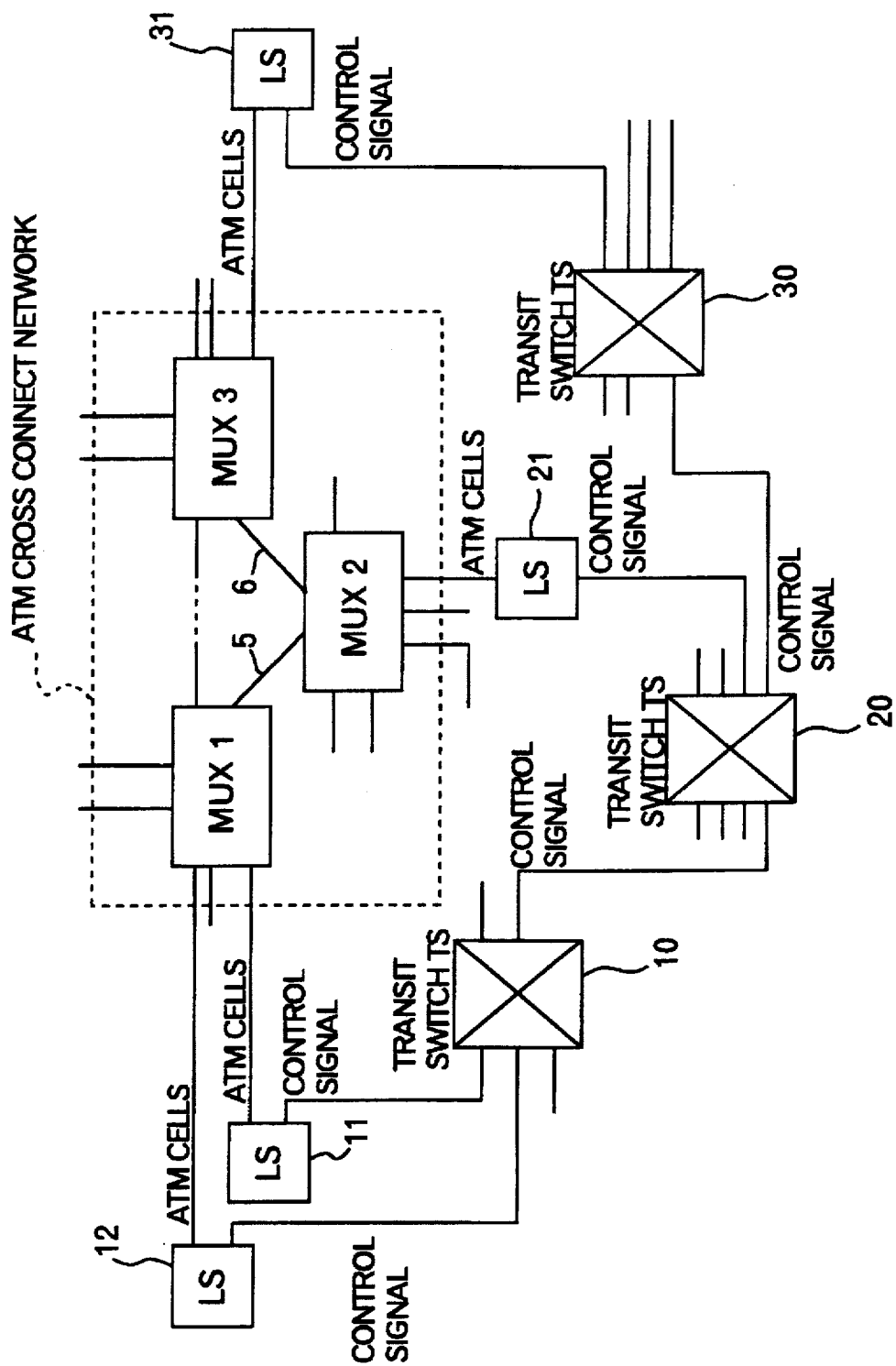
FIG. 2 is a detailed block diagram illustrating the ATM network system of FIG. 1.

Furthermore, a signaling network 4 for transmitting a control signal is comprised of transit switches and the local switches. Describing in details, as illustrated in FIG. 2, the local switches 11-13 belong to the transit switch 10, and in the same way, the local switches 21-23 to the transit switch 20, and the local switches 31-33 to the transit switch 30. The transit switches 10, 20 and 30 are connected to form a transit switching network. Therefore, a control signal can be transferred between arbitrary two local switches connected via one or more transit switches of the signalling network 4.

Figure 3:
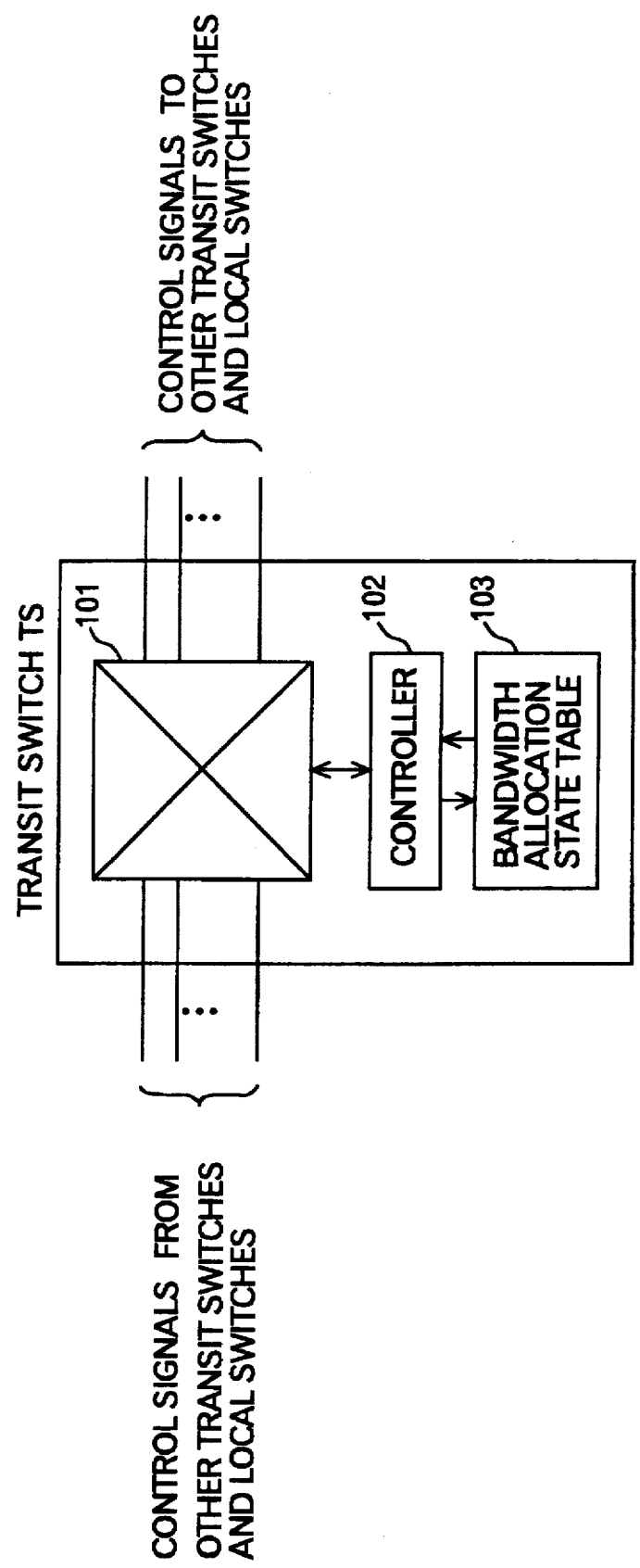
FIG. 3 is a schematic block diagram illustrating a configuration of a transit switch shown in FIG. 1.

In FIG. 3, the configuration of a transit switch TS is illustrated. The transit switch TS is comprised of a switch 101, a controller 102, and a state table 103. The switch 101 switches control signals to and from the other transit switches and local switches. The controller 102 performs switch control of the switch 101 as well as the bandwidth allocation management of the prescribed lines and links in the ATM cross connect network by accessing the state table 103. Under control of the controller 102, the state table 103 always stores an updated bandwidth allocation state of the prescribed lines and links to be controlled by this transit switch itself in the ATM cross connect network.

On receipt of a control signal from the originating local switch LS or transit switch TS, the controller 102, referring to the state table 103, decides whether the requested bandwidth can be allocated to the prescribed lines and links to be controlled. If the bandwidth allocation is allowed, the controller 102 reserves the requested bandwidth in the table 103, and then operates the switch 101 such that the control signal is switched to the subsequent transit switch TS according to the channel specifying signal. When the reply signal to the control signal is received at the transit switch TS, the reserved bandwidth is registered into the state table 103.

In the configuration of FIG. 2, for example, the transit switch 10 has a state table 103 for bandwidth management of the transmission line between any of the local switches 11-13 and the multiplexer MUX 1 and the link 5 connecting between the multiplexers MUX 1 and MUX 2. Similarly, the transit switch 20 has a state table 103 for the bandwidth management of the transmission line between any of the local switches 21-23 and the multiplexer MUX 2 and the link 6 connecting between the multiplexers MUX 2 and MUX 3. And the transit switch 30 has a state table 103 for the bandwidth management of the transmission line between any of the local switches 31-33 and the multiplexer MUX 3 and a prescribed link connecting between the multiplexer MUX 3 and the other prescribed multiplexer (not shown) which may be the multiplexer MUX 1.

Figure 4:
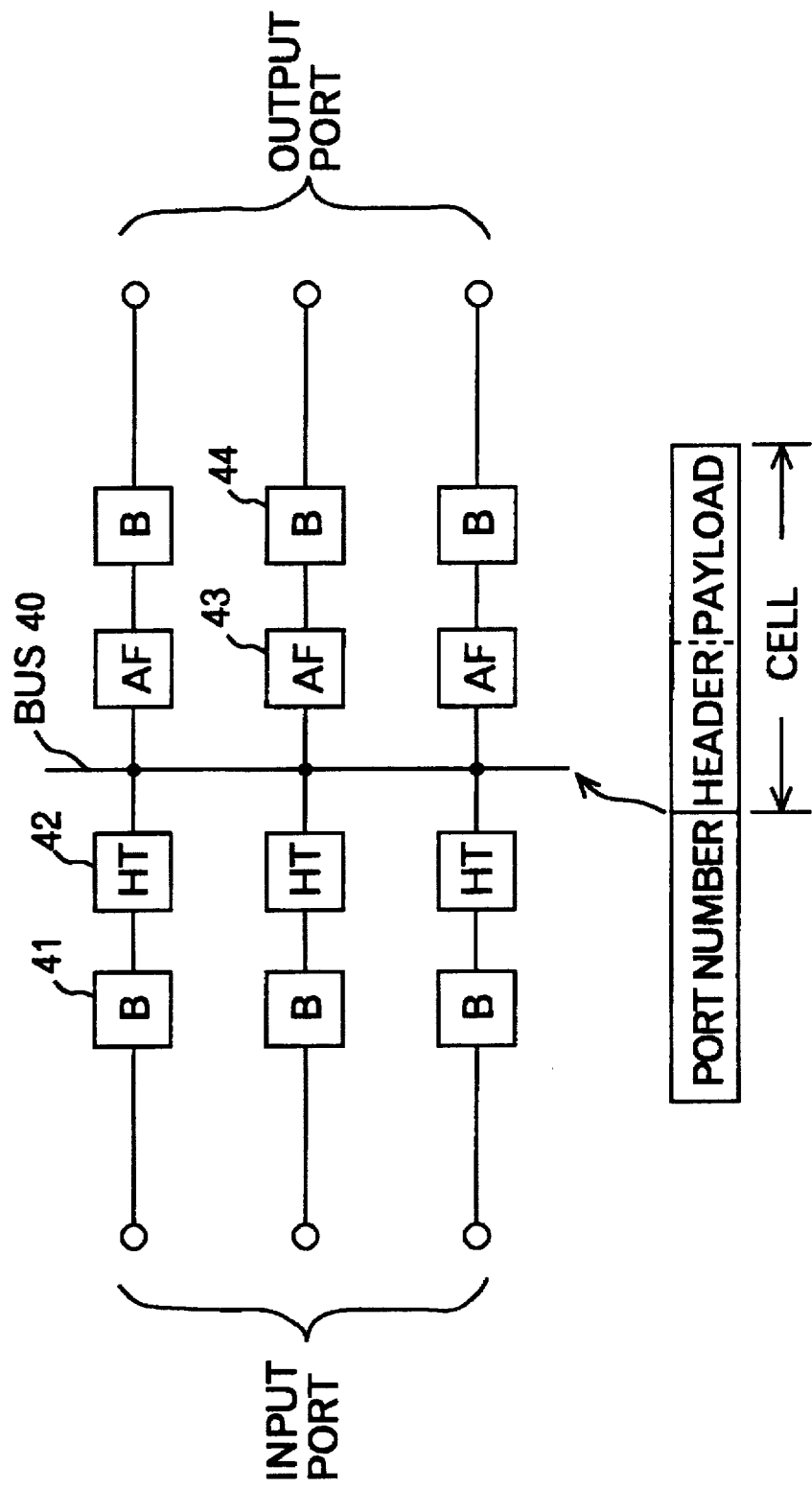
FIG. 4 is a schematic block diagram illustrating a configuration of a multiplexer shown in FIG. 1.

FIG. 4 illustrates a preferred embodiment of a multiplexer MUX which constructs the cross connect network. The multiplexer MUX is provided with buffers 41 and header translators 42 corresponding to the input port and is provided with address filters 43 and buffers 44 corresponding to the output port. The input port and the output port are connected by bus 40. An incoming ATM cell is input to the buffer 41 through the input port. The translator 42 updates the header of the ATM cell and adds an output number to the cell, and then outputs it to the bus 40. The address filter 43 detects the output port number added to the cell for address filtering. The filtered cell is retained in the buffer 44 and then is output through the output port.

Figure 5A:
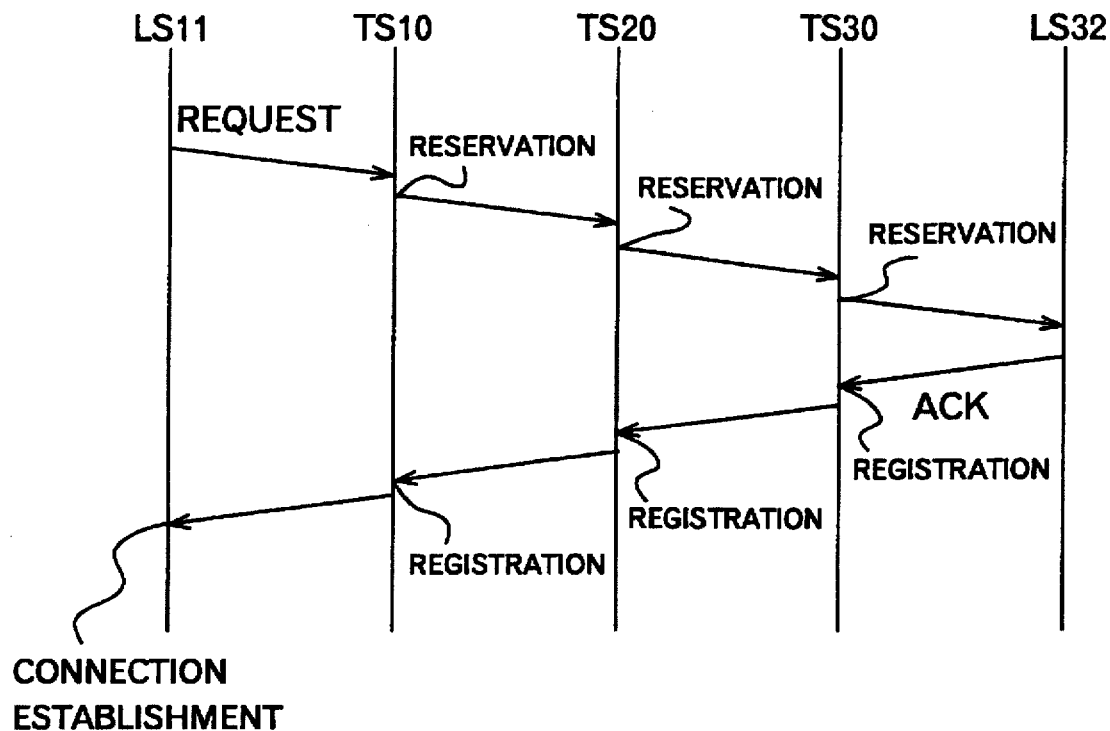
FIG. 5A is a flow chart of control signals in the embodiment.

Referring to FIG. 5A, the flow of control signals in the present embodiment will be explained. First of all, let us assume that a virtual path (VP) value is assigned in advance to a path between arbitrary two local switch. For example, to the path between the local switch 11 and the local switch 32, the following values of VPI (virtual pith identifier) have been assigned: VPI=1 between the local switch 11 and the multiplexer 1; VPI=2 between the multiplexer 1 and the multiplexer 2; VPI=5 between the multiplexer 2 and the multiplexer 3; and VPI=3 between the multiplexer 3 and the local switch 32.

When the local switch 11 tries to make communication with the local switch 32, the local switch 11 sends a request message to the transit switch 10 through the signalling network 4. The request message is comprised of at least the number of the destination local switch 32 and the required bandwidth.

The local switch 10, referring to the state table 103 thereof, reserves the required bandwidth on the line between the local switch 11 and the multiplexer 1 and the link 5 between the multiplexer 1 and the multiplexer 2. After the reservation has been completed, the transit switch 10 send the same request message to the transit switch 20 where the required bandwidth is reserved on the link 6 by referring to the state table 103 thereof as described above. Similarly, receiving the same request message, the transit switch 30 reserves the required bandwidth on the line between the multiplexer 3 and the local switch 32, and sends a call request message to the local switch 32.

Receiving a reply signal ACK from the local switch 32, the transit switch 30 registers the reserved bandwidth into the state table 103 thereof. This reply signal is going in the opposite direction from the transit switch 30 to the local switch 11 with the reserved bandwidth registered at each transit switch.

Figure 5B:
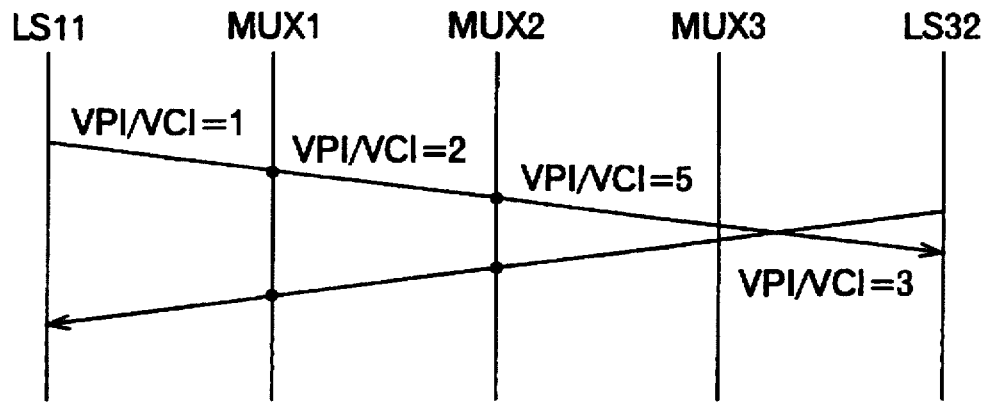
FIG. 5B is a flow chart of ATM cells in the cross connect network of the embodiment.

After the registration of the required bandwidth has been successfully completed, as shown in FIG. 5B, the communication is carried out between the local switch 11 and the local switch 32 through the cross connect network in which VPI is defined in advance. At the time when such a communication is ended, the registered bandwidth allocation is released so as to enable another allocation for other communications.

In FIGS. 5A and 5B, the symmetrical communication is illustrated in which the bandwidth required by the local switch 11 is equal to that required by the local switch 32. In this case, as described above, the bandwidth allocation sequence between the local switches 11 and 32 is carried out at one time. Of course, the transmission of a control signal from the local switch 32 to the local switch 11 also can reserve a required bandwidth independently just as the transmission of the control signal from the local switch 11.

Since the allocable bandwidth of each transmission line and link is determined in advance, a transit switch TS refuses the request of a new bandwidth reservation in cases where the total of the registered bandwidth and the new requested bandwidth exceeds the allocable bandwidth. In this case, the transit switch TS sends this refusal notice to the originating transit switch through the signalling network 4. On receipt of this refusal notice, the transit switch TS releases the reserved bandwidth in the state table 103 thereof.

In the present embodiment, a mesh-like logical link network is provided to the cross connect network based on VCI/VPI in advance. Therefore, each transit switch need not have the dynamic allocation capability based on VCI/VPI but the dynamic bandwidth allocation function based on the bandwidth management of the prescribed links. In a local switch LS, a cell assembling/disassembling function is needed, but ATM switching function is unnecessary. In a transit switch, the terminating and switching capability of control signals is needed, but the switching capability of ATM cells is also unnecessary.

Figure 6:
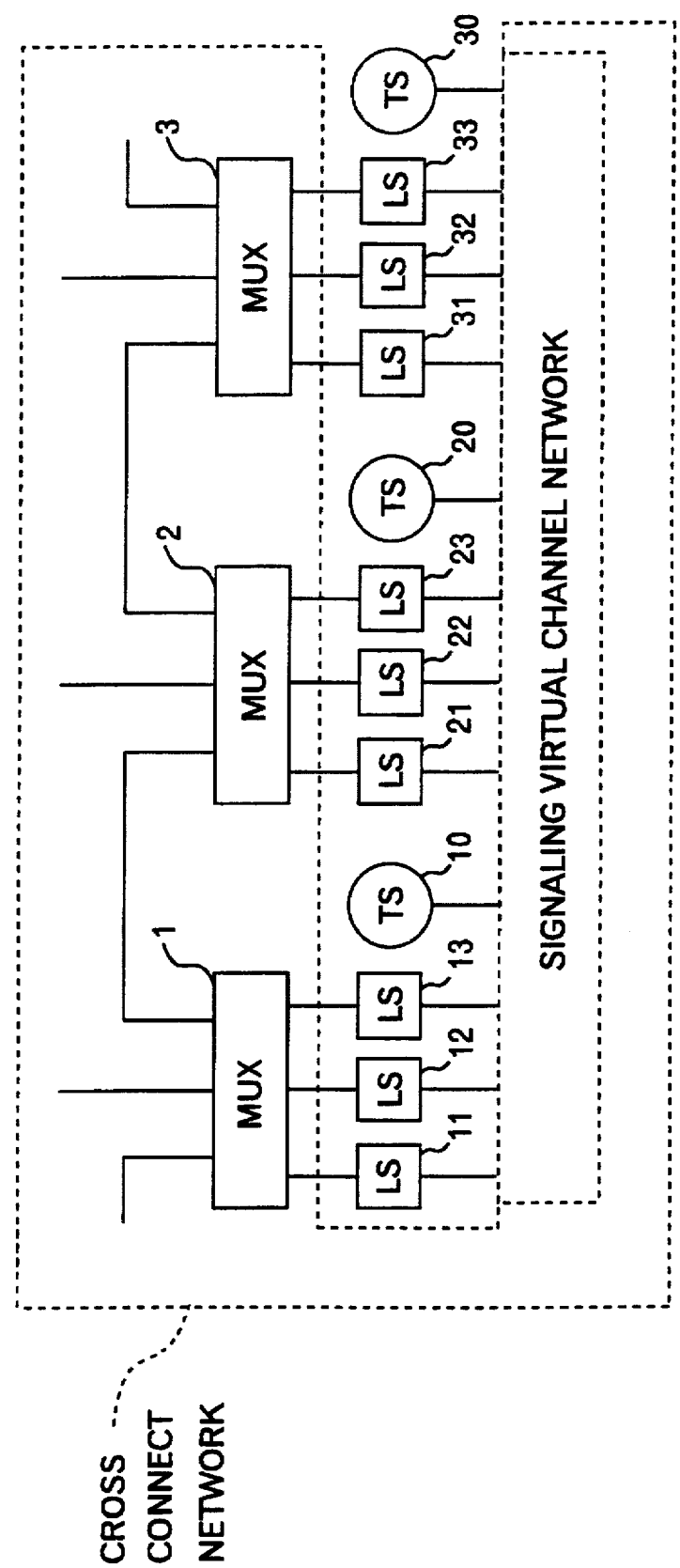
FIG. 6 is a schematic block diagram illustrating an ATM network system according to another embodiment of the present invention.

FIG. 6 shows an ATM network configuration of another embodiment according to the present invention. In this embodiment, the signalling network is realized as an signaling virtual channel network in the ATM cross connect network. The operation of this embodiment is the same as that of the ATM network shown in FIG. 1.

Figure 7:
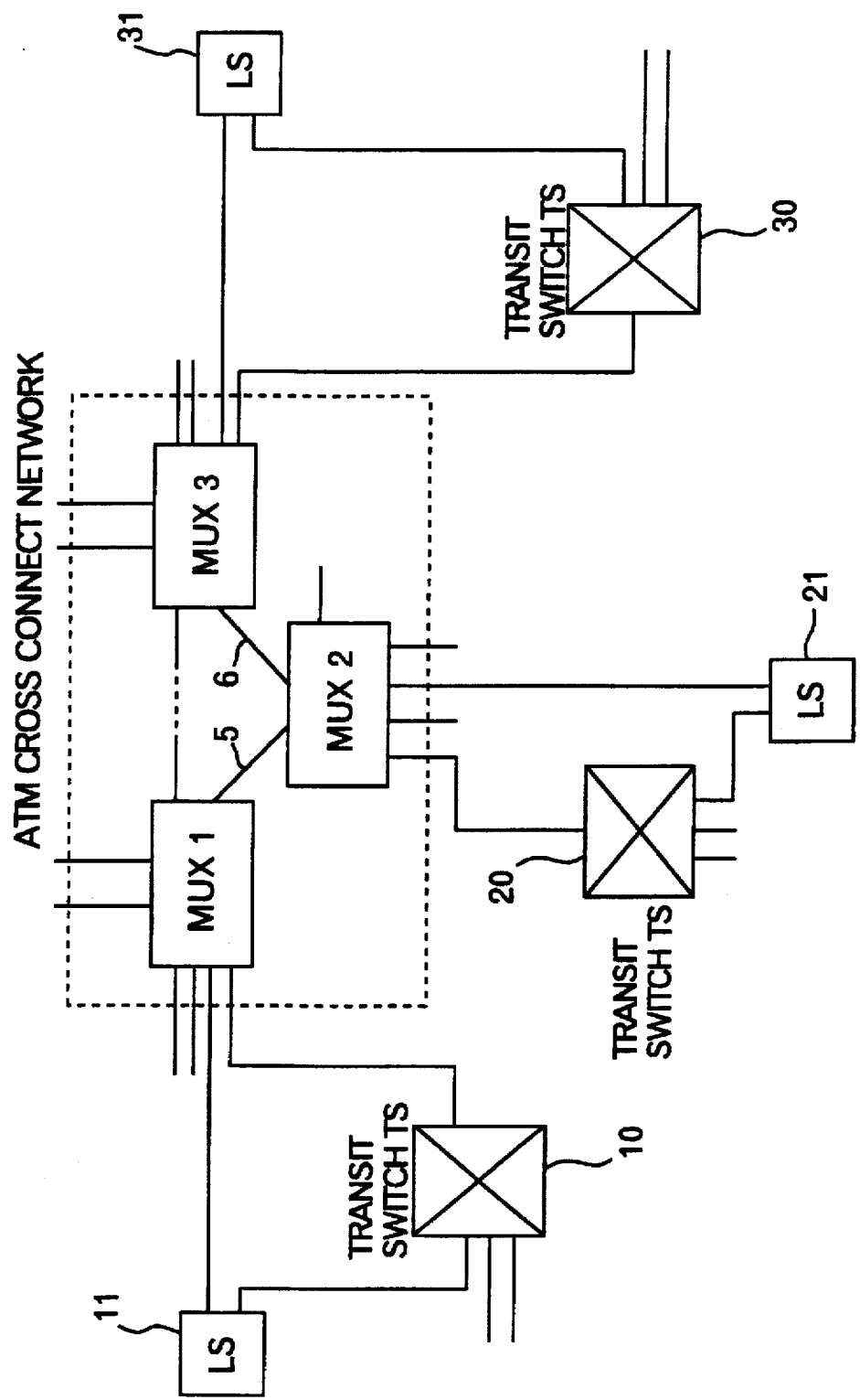
FIG. 7 is a detailed block diagram illustrating the ATM network system of FIG. 6.

FIG. 7 shows a more detailed configuration of FIG. 6. Although a transit switch TS is connected to the cross connect network, the transit switch TS is really connected to the signalling virtual channel network which is logically separate from the cross connect network which transfers ATM cells. Therefore, for the transit switch TS, as explained above, the cell assembling/terminating capability of the control signal is necessary, but the transit switching capability of cells is unnecessary.

In the embodiments above described, VP in the cross connect network is assigned by VPI in advance, but it can be assigned by both VPI and VCI.

As explained above in detail, in the communication system according to the invention, a required bandwidth is allocated to the prescribed transmission lines and links in the cross connect network by the respective transit switches each having the bandwidth management capability, therefore the dynamic bandwidth allocation can be achieved by the transit switches without ATM cell transit switching capability. No signal associated with call processing is transmitted between a transit switch and the cross connect system.

Furthermore, since ATM cells are transmitted from an originating local switch to a destination local switch without going through any transit switch, The reduction of delay time, hardware amount, and the number of functions of a transit switch is achieved, resulting in high efficient communication system.

I claim:

1. A communication network comprising:
   a plurality of nodes;
   a data transmission network for transferring a data signal between a first node and a second node, said data transmission network comprising a plurality of multiplexers and a plurality of transmission lines wherein said multiplexers are connected through said transmission lines, each of said multiplexers being connected to a plurality of said nodes so as to transfer said data signal from said first node to said second node through at least one of said transmission lines; and
   a control signal transmission network, separate from said data transmission network, for transferring a control signal between said first node and said second node,
   said control signal transmission network comprising:
      a plurality of switching nodes each associated with one of said transmission lines of said data transmission network, said control signal being transferred between said first node and said second node through at least one of said switching nodes so as to establish a data connection between said first node and said second node in said data transmission network,
      each of the switching nodes comprising:
         switching means for transferring said control signal according to a destination address included in said control signal; and
         control means for performing bandwidth allocation control of an associated transmission line of said cross connect network based on a bandwidth request included in said control signal, said associated transmission line being association with said switching node.

2. The communication network as set forth in claim 1, wherein said data transmission network is physically separated from said control signal transmission network.

3. The communication network as set forth in claim 1, wherein said data transmission network is logically separated from said control signal transmission network.

4. The communication network as set forth in claim 1, wherein said data transmission network is an ATM (Asynchronous Transfer Mode) cross connect network, and said control signal transmission network is a signaling network.

5. The communication network as set forth in claim 4, wherein said signaling network comprises virtual channels in said ATM cross connect network.

6. The communication network as set forth in claim 1, wherein said control means comprises:
   a memory for storing an allocated bandwidth of said associated transmission line; and
   a controller responsive to said control signal for allocating a requested bandwidth of said bandwidth request to said associated transmission line when a total of said requested bandwidth and said allocated bandwidth which has been already allocated to said associated transmission line is not greater than an allocable bandwidth of said associated transmission line.

7. A communication network comprising:
   a plurality of local switching nodes accommodating a plurality of terminals, each of said local switching nodes generating data blocks and a control signal in response to an input signal from one of said terminals;
   a cross connect network comprising a plurality of cross connect systems and a plurality of links each linking one of said cross connect systems to another, said cross connect network being provided with a plurality of virtual paths so as to make a data connection between a first one of said local switching nodes and a second one of said local switching nodes, said data blocks received from one of said first and second local switching nodes being transferred through said data connection; and
   a control signal transmission network, separate from said cross connect network, for transferring said control signal between said first one of said local switching nodes and said second one of said local switching nodes,
   said control signal transmission network comprising:
      a plurality of transit switching nodes each associated with one of said links of said cross connect network, said control signal including a destination address and a bandwidth request, and said control signal being transferred between said first one of said local switching nodes and said second one of said local switching nodes through at least one of said transit switching nodes so as to establish a data connection between said first one of said local switching nodes and said second one of said local switching nodes in said cross connect network based on said destination address and said bandwidth request,
      each of said transit switching node comprising:
         switching means for transferring said control signal according to said destination address included in said control signal; and
         control means for performing bandwidth allocation control of an associated link of said cross connect network based on said bandwidth request included in said control signal, said associated link being associated with said transit switching node.

8. The communication network as set forth in claim 7, wherein said cross connect network is physically separated from said control signal transmission network.

9. The communication network as set forth in claim 7, wherein said cross connect network is logically separated from said control signal transmission network.

10. The communication network as set forth in claim 7, wherein said cross connect network is an ATM (Asynchronous Transfer Mode) cross connect network, and said control signal transmission network is a signaling network.

11. The communication network as set forth in claim 10, wherein said signaling network comprises virtual channels in said ATM cross connect network.

12. The communication network as set forth in claim 7, wherein said control means comprises:
   a memory for storing an allocated bandwidth of said associated link; and
   a controller in response to said control signal for allocating a requested bandwidth of said bandwidth request to said associated link when a total of said requested bandwidth and said allocated bandwidth which has been already allocated to said associated link is not greater than an allocable bandwidth of said associated link.

13. A connection establishment method for a communication network comprising a plurality of nodes, a cross connect network and a control signal transmission network, said cross connect network comprising a plurality of multiplexers and a plurality of links each linking one of said multiplexers to another, said cross connect network being provided with a plurality of virtual paths for a data connection between a first node and a second node; and said control signal transmission network for transferring said control signal between said first node and said second node, said control signal transmission network being separate from said cross connect network and comprising a plurality of switching nodes each associated with one of said links of said cross connect network, said control signal including a destination address and a bandwidth request.

said method comprising the steps of:

transferring said control signal from said first node to said second node through said control signal transmission network while reserving a single virtual path between said first node to said second node in said cross connect network;

allocating a requested bandwidth requested by said bandwidth request included in said control signal to said single virtual path of said cross connect network, when a total of said requested bandwidth and an allocated bandwidth which has been already allocated is not greater than an allocable bandwidth of each associated link included in said single virtual path; and transferring data between said first node and said second node through said single virtual path of said cross connect network.

14. The method as set forth in claim 13, wherein:

said single virtual path is reserved sure that said requested bandwidth for said single virtual path is reserved by using said bandwidth request of said control signal transferred from said first node to said second node; and said single virtual path is allocated such that said requested bandwidth for said single virtual path is registered by using a reply signal to said control signal from said second node to said first node.

15. The method as set forth in claim 13, wherein said cross connect network is physically separated from said control signal transmission network.

16. The method as set forth in claim 13, wherein said cross connect network is logically separated from said control signal transmission network.

17. The method as set forth in claim 13, wherein said cross connect network is an ATM (Asynchronous Transfer mode) cross connect network, and said control signal transmission network is a signalling network.

18. The method as set forth in claim 17, wherein said signalling network comprises virtual channels in said ATM cross connect network.

* * * * *